United States Patent [19]

Matthews et al.

[11] Patent Number: 5,030,078
[45] Date of Patent: Jul. 9, 1991

[54] APPARATUS FOR FOOD PRODUCT MANUFACTURE

[75] Inventors: Bernard T. Matthews, Norwich; David J. Joll, Holt; David N. Wilson, Norwich; John H. Barker, Sheringham, all of England

[73] Assignee: Bernard Matthews Plc, Norfolk, England

[21] Appl. No.: 470,736

[22] Filed: Jan. 26, 1990

[30] Foreign Application Priority Data

Jan. 30, 1989 [GB] United Kingdom ............... 8901987

[51] Int. Cl.5 .................... A22C 7/00; A21C 11/10; A21C 11/16; B29C 47/06
[52] U.S. Cl. ................. 425/133.1; 99/450.1; 99/450.7; 425/296; 425/307; 425/308; 425/316; 425/324.1
[58] Field of Search ............... 83/628; 425/296, 133.1, 425/307, 308, 306, 324.1, 316; 99/450.1, 450.7

[56] References Cited

U.S. PATENT DOCUMENTS

| 3,430,290 | 3/1969 | Kinslow | 83/628 |
| 3,572,259 | 3/1971 | Hayashi | 425/307 |
| 4,734,024 | 3/1988 | Tashiro | 425/308 |
| 4,767,305 | 8/1988 | Tashiro | 425/308 |
| 4,854,842 | 8/1989 | Kobayashi | 425/296 |
| 4,882,185 | 11/1989 | Simelunas et al. | 425/307 |

FOREIGN PATENT DOCUMENTS

| 667720 | 11/1965 | Belgium . |
| 0127715 | 12/1984 | European Pat. Off. . |
| 0247826 | 2/1987 | European Pat. Off. . |

Primary Examiner—Willard E. Hoag
Attorney, Agent, or Firm—Oliff & Berridge

[57] ABSTRACT

Apparatus for making food product comprising a closed outer shell and a filling is made from a coextruded body. The body advances through a reciprocating cutting head 3 driven by a reciprocating shaft 10. The shaft 10 rotates to drive, through cam means, blades within the head 3.

8 Claims, 8 Drawing Sheets

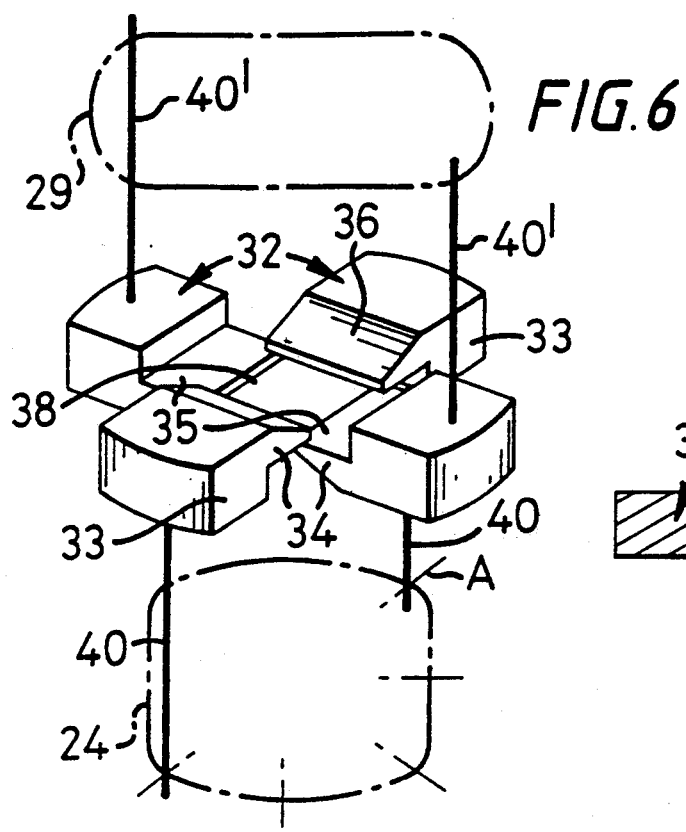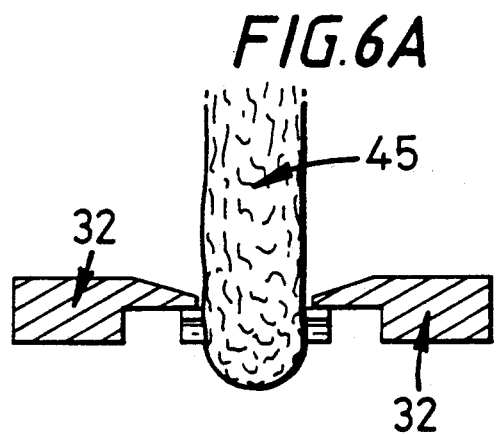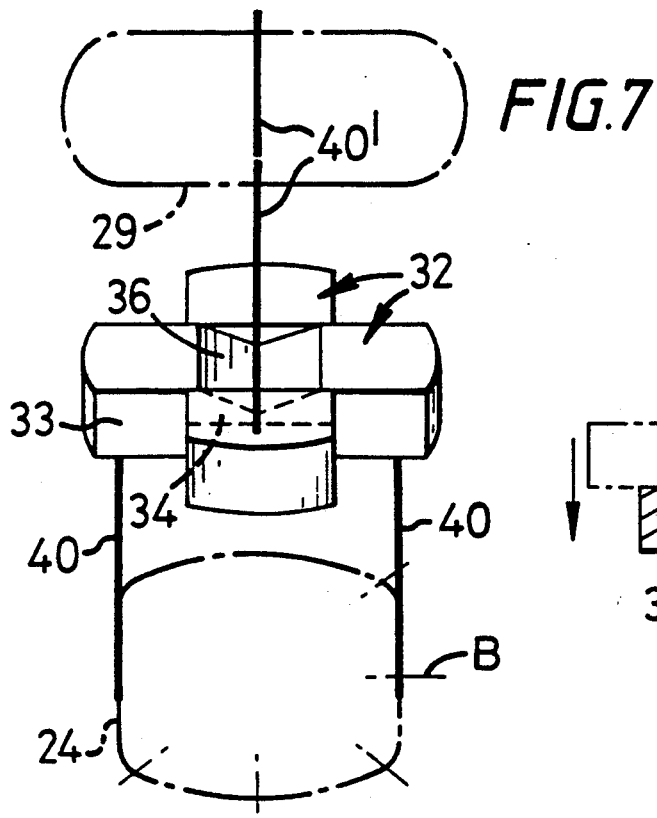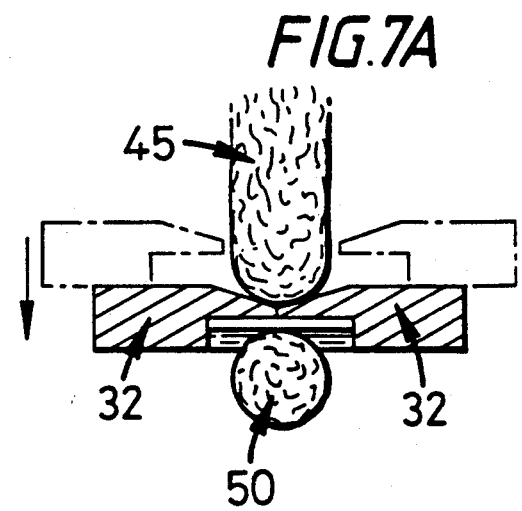

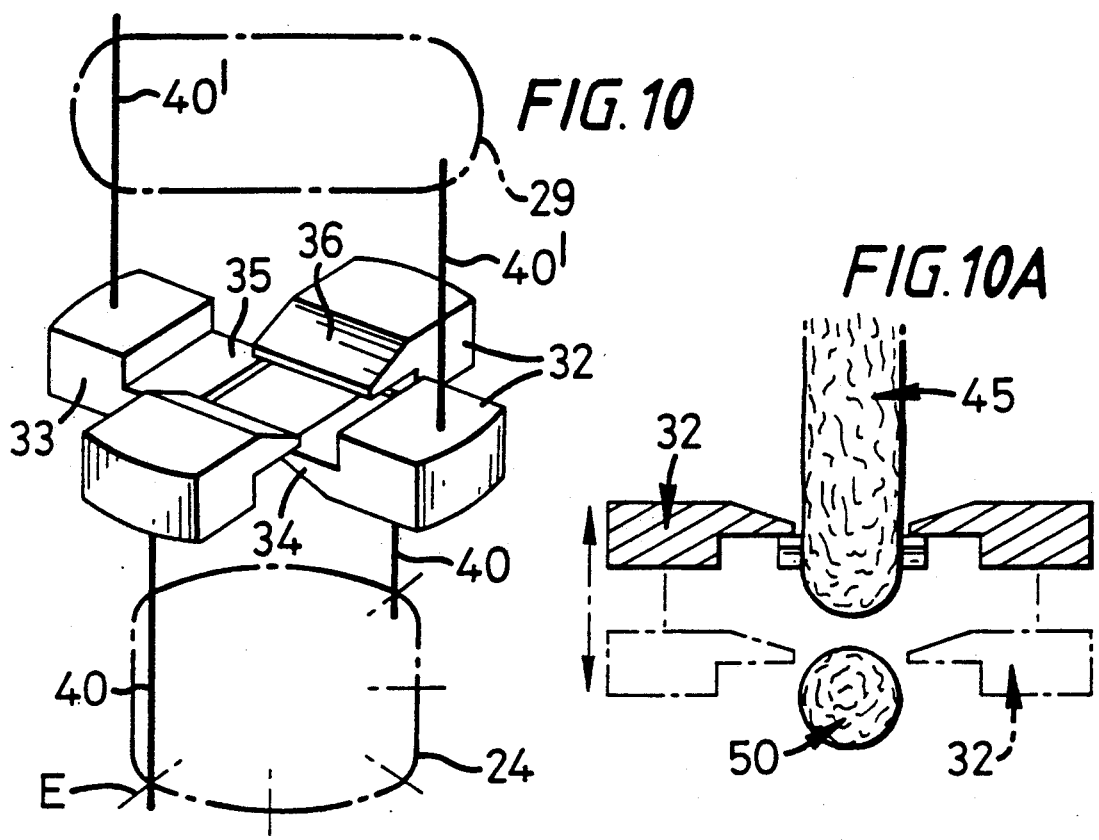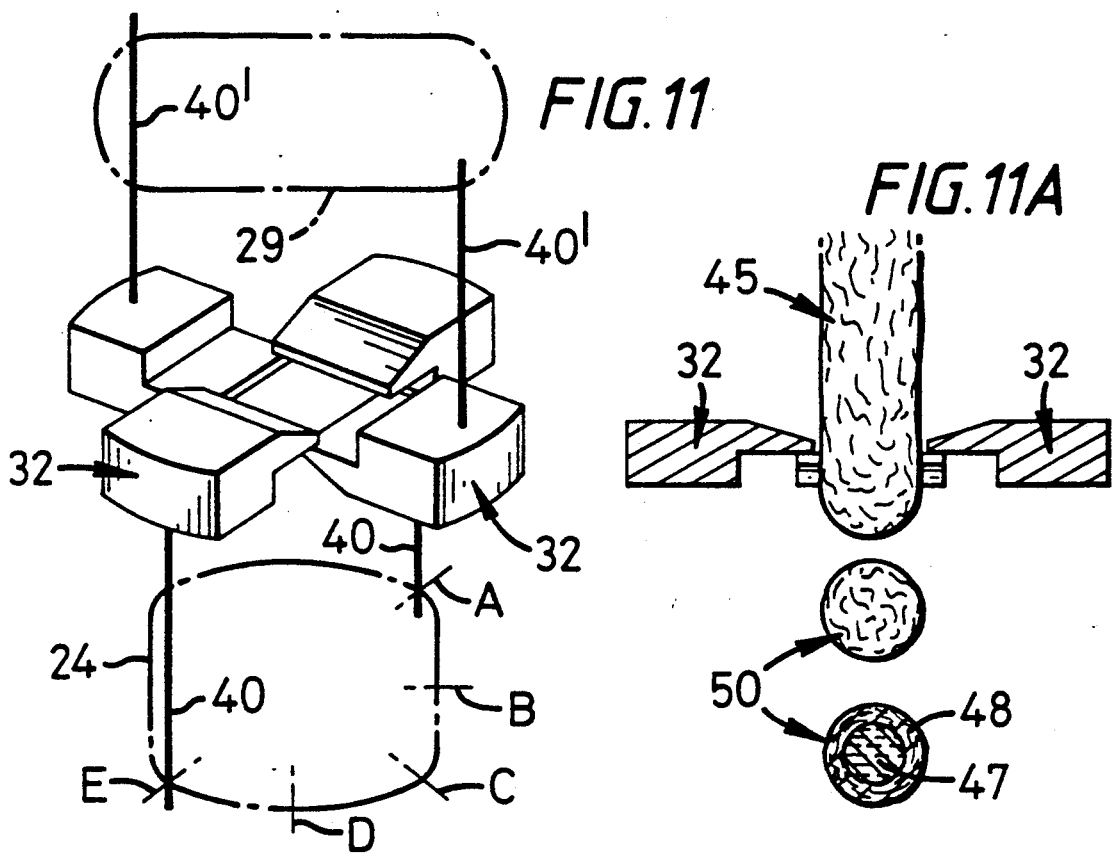

APPARATUS FOR FOOD PRODUCT MANUFACTURE

This invention relates to the manufacture of a food product comprising a closed outer shell, either spherical or elongate with rounded ends, and a filling. The invention is particularly concerned with the manufacture of a product wherein the outer shell is of meat (usually comminuted) or meat-based and the filling is a relatively fluid substance of complementary flavour.

The method with which the present invention is particularly concerned comprises coextruding, usually downwardly, a body comprising an outer annular casing and an inner core. The coextrudate passes through the opening of a cutter/former mechanism which closes to pull the outer casing inwardly into a closed hemispherical end, the outer shell, and ultimately severs the body containing the core as the filling. To operate effectively and to define the correct shape of the product the cutter/former should reciprocate, moving forwardly at approximately the speed of coextrusion while closing.

A machine for carrying out such a method is described in EPA No. 0,247,826.

The object of the present invention is to provide an improved method and an apparatus for carrying out said method.

In accordance with the present invention a method of forming a food product of the kind set forth comprises extruding the body through a cutter/former mechanism with blades which open to allow passage of the coextruded body and close to form the rounded ends such blades being driven through the intermediary of cam means by a rotating shaft carrying the cutter/former mechanism. The rotating shaft is reciprocably mounted and co-operating means on the shaft and a support structure cause the shaft to reciprocate during rotation.

The invention further provides apparatus to carry out the above method which apparatus typically comprises the following integers:

(a) A support structure;

(b) A coextrusion head mounted on said structure connected to means for supplying under pressure core-forming material and casing-forming material.

(c) A forming head with an aperture adjacent the coextrusion head, said aperture being defined by blades movable between an open position which allows passage of the coextruded body and a closed position which forms rounded termination of the body and severs the latter into products;

(d) A rotatable drive shaft reciprocably mounted in the support structure and connected to the forming head so that sliding motion of the shaft produces a similar motion of the forming head.

(e) A connection between the shaft and the support structure so that rotation of the shaft causes the reciprocating motion; and (f) A connection between the shaft and the blades of the forming head whereby rotation of the shaft drives the blades to open and close.

The shaft may carry a cam to develop linear motion of the or each blade directly. It is however preferred that the forming head includes a rotatable member connected to the shaft by a gear or the like. The said member rotates and by cam means converts this rotational movement to linear opening and closing movement of the blades. Each blade may have a cam peg engageable in a cam track so that movement of the cam peg around the track causes that cutter to perform an open and closing cycle. Typically there are four cutters arranged in a right angle cruciform array, each cutter having a cam peg engaging a cam track. Thus one opposed pair of blades may have cams engaging a lower cam track and the other opposed pair of cams engaging an upper cam track.

The necessary relative rotation to operate the blades can be achieved either by rotating a blade holder or the elements defining the or each cam track.

The connection between the shaft and support structure may be a ball oscillator. Thus the shaft may have an inclined annular groove and the support structure a vertically fixed ball. As the shaft rotates it is caused to move up and down by the engagement of the ball and the groove.

BRIEF DESCRIPTION OF THE DRAWINGS

Apparatus in accordance with the present invention will now described by way of example and with reference to the accompanying drawings wherein:

FIGS. 6 to 11 are schematic views of the forming head showing the forming blades performing their stroke; and FIGS. 6A to 11A are alongside views showing the product being produced according to FIGS. 6 to 11.

Figure 1:
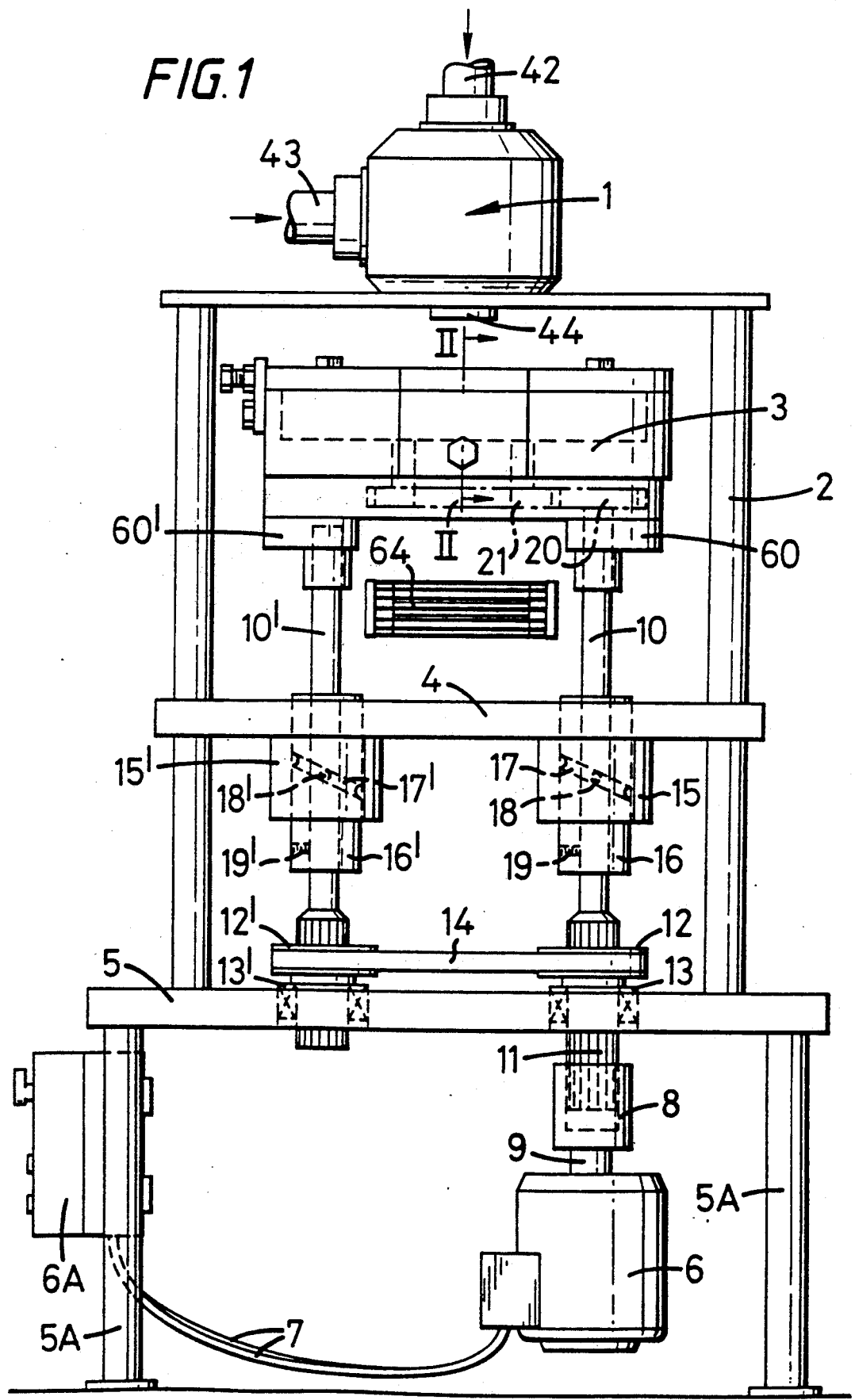
FIG. 1 is a side view of apparatus in accordance with a particular embodiment.

Referring initially to FIG. 1 of the drawings the apparatus illustrated therein comprises a coextrusion head 1 mounted symmetrically on the top of a tower frame structure 2. A forming head 3 is mounted for vertical sliding movement within the frame 2 in guides on a fixed cross-member or bed 4 and a lower cross-member or base 5, supported on pillars 5A. The forming head 3 has a rotating element to drive cutter/former mechanism in a manner to be described. An electric motor 6 provides the drive for these reciprocating and rotary motions and is mounted under the base 5. The motor 6 is controlled and powered through cables 7 from console 8A.

The main drive for the forming head is a reciprocable shaft 10 with splines 11 at the lower end engaging a splined coupling 8 to the motor main shaft 9. A similar reciprocable shaft 10', laterally spaced from shaft 10, also has splines 11' at the lower end seated in the base 5. Pulleys 12 and 12' are mounted in bearings 13, 13' in the base 5 and have a splined connection to the shaft 12. A belt 14 connects pulleys 12 and 12'. The motor 6 drives both shafts 10 and 10' rotationally with vertical movement of the shafts being allowed by the splined connections.

The fixed bed 4 has two dependent cylindrical housings 15, 15' each mounting a ball oscillator to convert rotational motion of the respective shaft 10, 10' to reciprocating movement of the shafts in the splines. The top ends of both shafts 10 are so received in mounting bearings 60, 60' fixed to the underside of the forming head 3 that reciprocation of the rotating shafts 10, produces the same reciprocation of the o forming head 3. Each shaft 10, 10' has fixed to it by a grub screw 19, 19' a sleeve 16, 16' each sleeve having an inclined annular peripheral groove 17 with a simple harmonic profile. A ball 18, 18' caged so as to be able to rotate in each housing 15, 15' seats in the respective groove 17, 17' so that one reciprocating down and up cycle of the shaft is generated by each shaft revolution. The grub screws 19 determine the angular relationship between each ball and its groove thereby allowing the phase of the oscillator to be adjusted and the correct top dead centre (TDC) position to be established.

The upper end part of the right hand shaft 10 has a gear 20 which, drives with a 50% reduction, a gear 21 connected to the rotating part of the cutter/former assembly. Reference will now be made to FIGS. 2 to 5 of the drawings.

Figure 2:
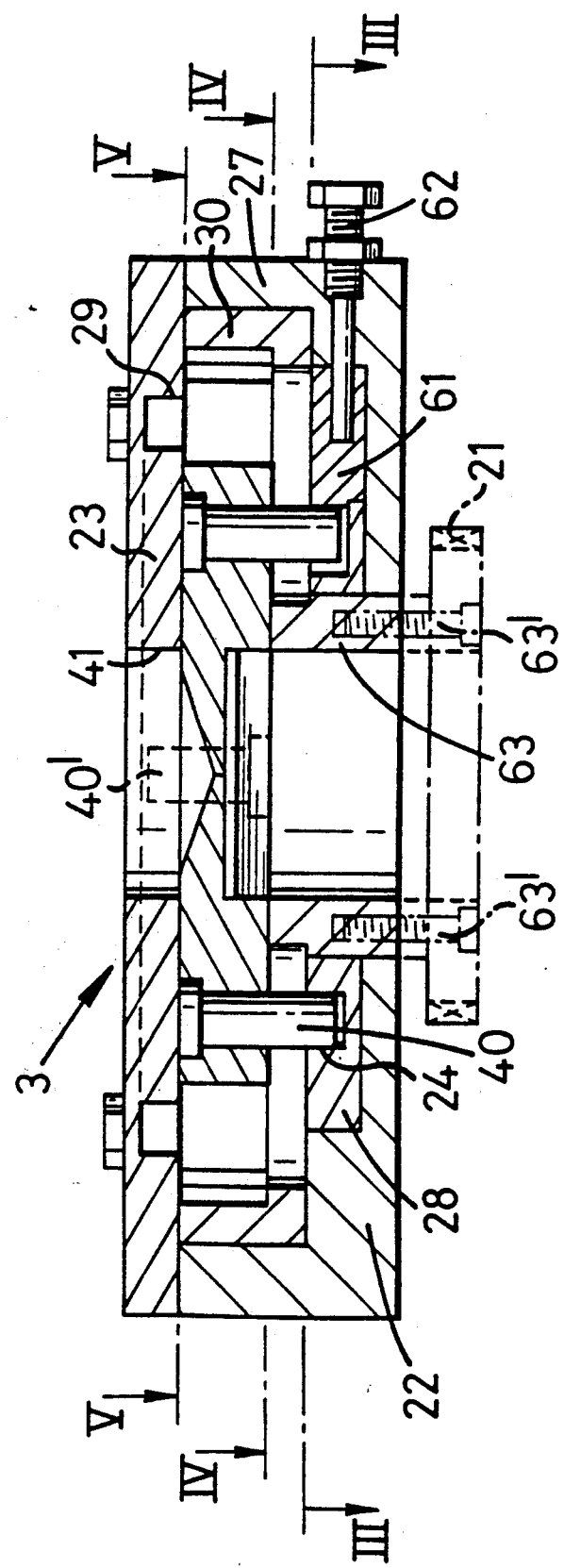
FIG. 2 is a section through the forming head on the lines II—II of FIG. 1.
Figure 3:
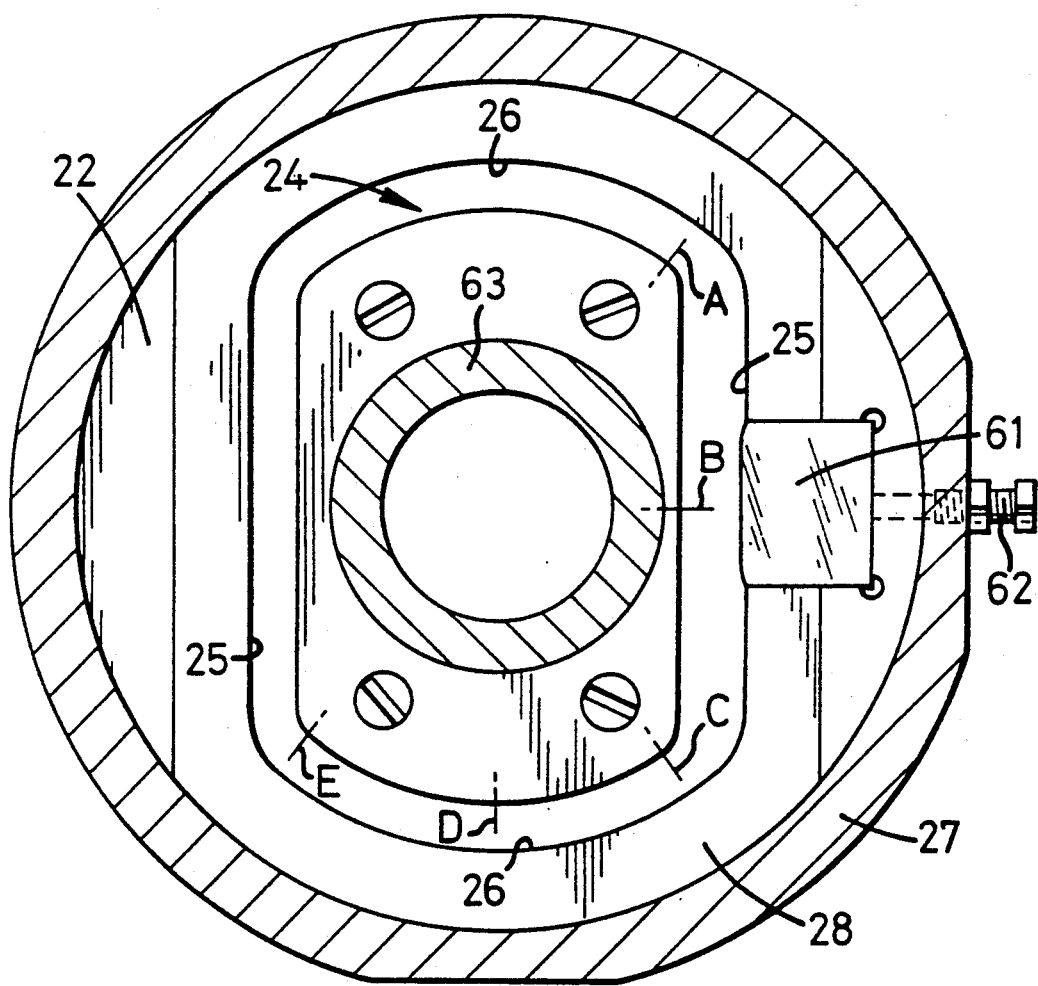
FIGS. 3, 4 and 5 are respectively plan sections through the forming head on the lines III—III, IV—IV V—V of FIG. 2.

Referring firstly to FIG. 2 it will be seen that the forming head comprises upper and lower housing parts 22 and 23. The lower part 22 is best seen in FIG. 3 and comprises a structural rimmed part 27 and a basal plate 28 of hard structural plastics with a track 24 for a cam peg in the form of an upwardly facing channel. The track has straight sides 25 and curved ends 26, the distance between straight side 25 being less than that between curved ends 26. Right hand track 25 is slightly wider than the left and an abutment member 61 radially movable by screw member 62 can effectively narrow this track to provide a radially inward nipping force to a cam peg. The upper part 23 of the housing is a one-piece plastic plate with a dependent track 29 similar to track 24 on plate 28. In the embodiment being described the parts are fixed and a former/cutter plate 30 fixed to gear 21 by sleeve 63 and bolts 63' rotates within the housing.

Figure 4:
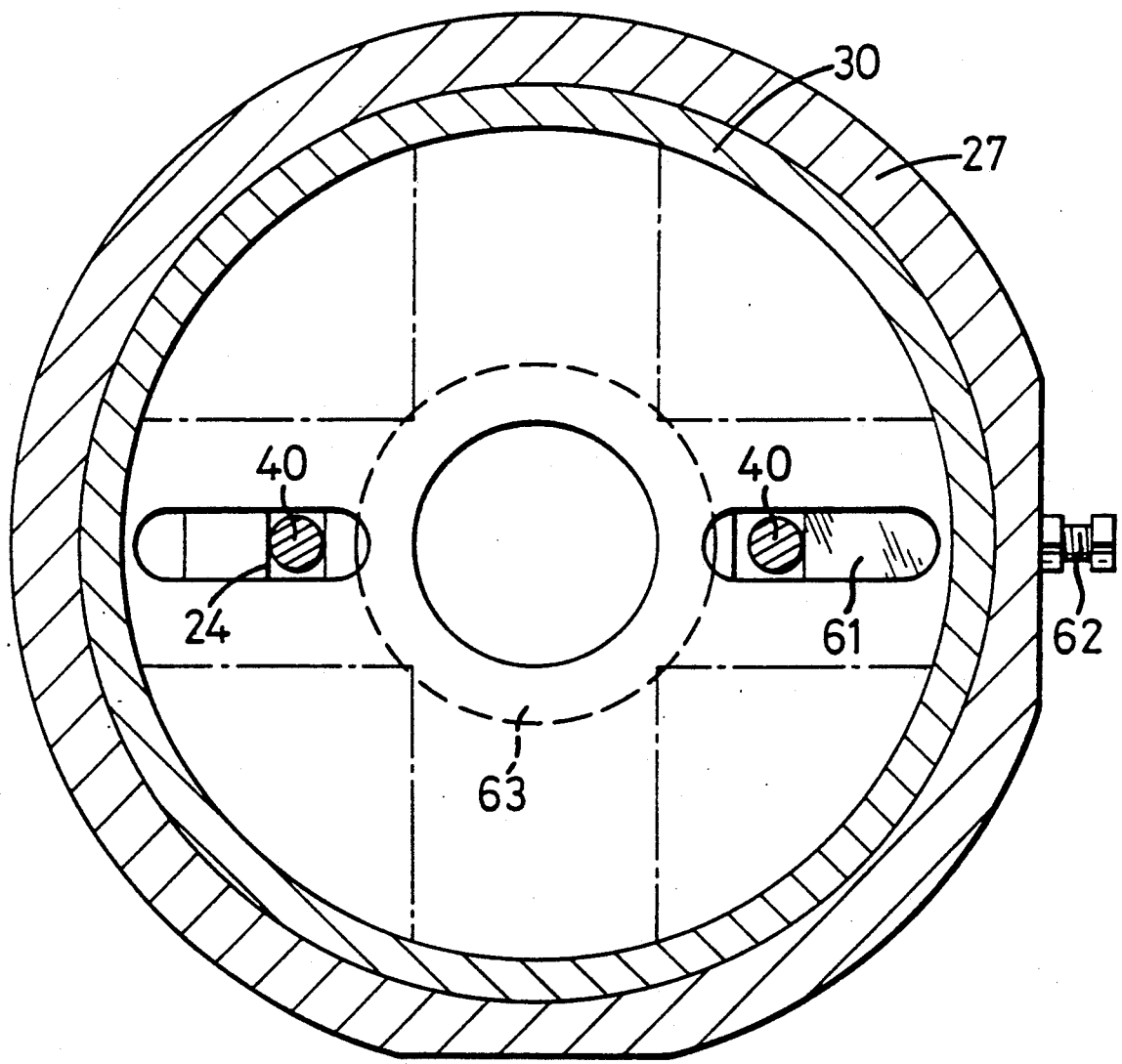
Figure 5:
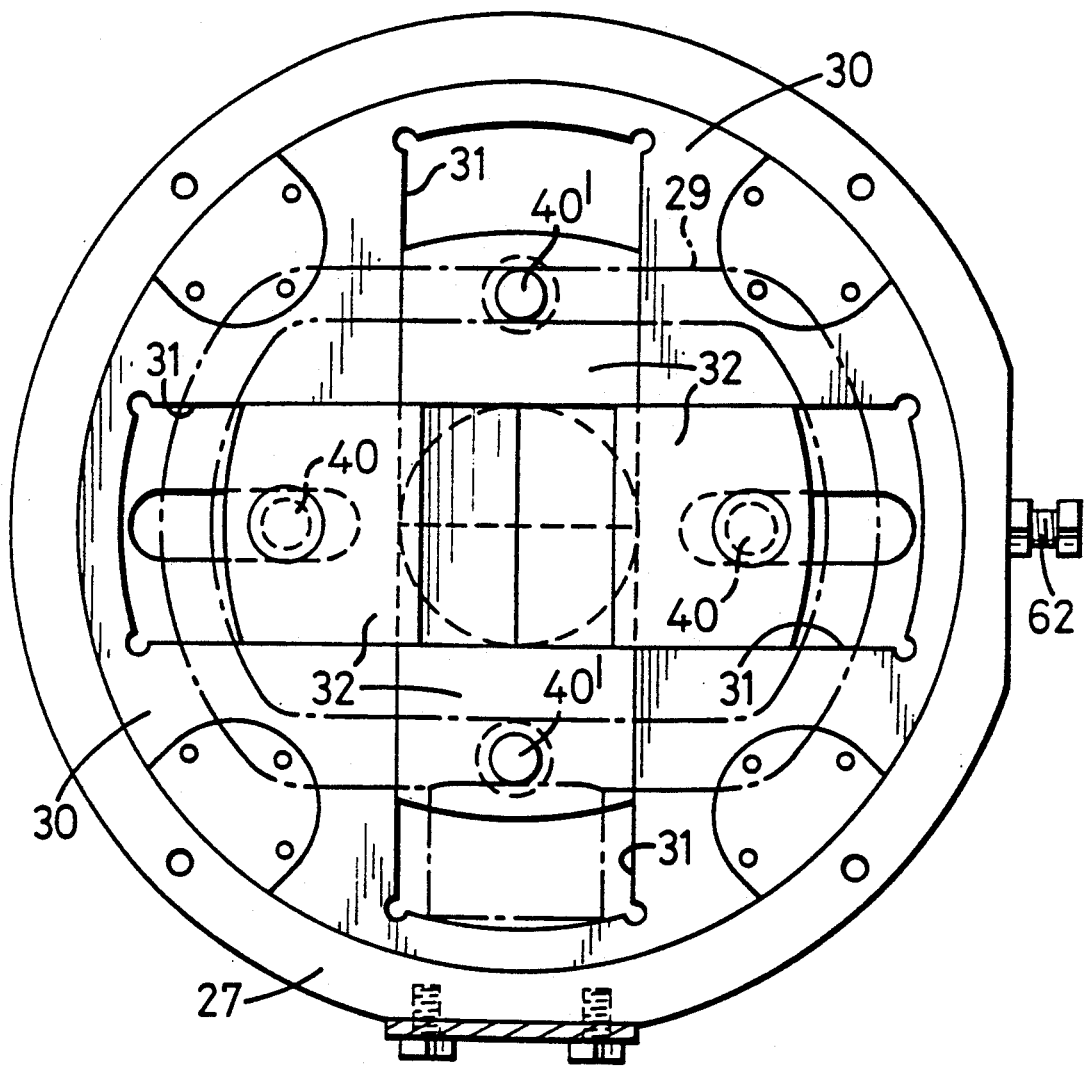

FIGS. 4 and 5 show that rotating plate 30 comprises wide channel shaped recesses 31 in a right angled cruciform formation, each recess housing as a longitudinal sliding fit (radial with respect to the plate) a cutter blade 32. The form of the cutter blades can best be seen in the diagrammatic FIGS. 6 to 9. Each blade 32, advantageously formed as a piece of hard plastic material comprises a generally rectangular body 33 slidable in the respective recess 31 and a wedge-shaped blunt ended blade portion 34 with a rebate 35. One pair of opposed blades has the inclined surfaces 36 defining the blade facing upwardly and the other opposed pair has the said surfaces 36 facing downwardly. The rebate flat surface of one blade rides over or under the rebate flat surfaces of the adjacent blades as illustrated. Thus briefly stated the blades 31 can slide radially in a manner to be described between the open position defining a square aperture 38 as shown in FIGS. 6 and 6A for example and a closed position as shown in FIGS. 7 and 7A.

In order to effect this sliding opening and closing each one of opposed blades in one pair has a downwardly projecting cam peg 40 (see FIG. 2) and each blade of the other opposed pair have upwardly directed cam pegs 40' (see FIG. 5).

Thus when dependent pegs 40 ride in the straight sections 25 of track 24 the blades of that pair will be closed. When upstanding pegs 40' ride in straight sections of upper track 29 (at right angles to track 24) those blades of the other pair at right angles to the first pair will also be closed. When the pegs ride in curved sections 26 and the corresponding sections of the upper track the blades will be open. Rotation of plate 30 governed by shaft 10 thus opens and closes the former/cutters. This will be described in more detail.

The coextrusion head 1 is positioned above the centre of blade opening 38 the plate 23 having a corresponding opening 41. The coextrusion head is of conventional form having an axial connection 42 to a pumped supply of core-forming material and a peripheral connection 43 to a pumped supply of material to form an annulus around the core. Thus in use the coextrusion head extrudes downwardly through die a cylindrical body 45 comprising a core 47 of circular cross section and an outer layer 48 of annular circular cross-section (FIG. 11A). A conveyor for removing the products is diagrammatically illustrated at 64 and runs at right angles to the plane of FIG. 1.

The forming cycle of the method in accordance with the invention will now be described with reference to diagrammatic FIGS. 6 to 11 and FIGS. 6A to 11A.

In these diagrammatic figures the four blades 32 are shown realistically, the upper and lower cam tracks 24 and 29 are shown in dot and pick lines whilst the cam pegs 40 and 40' are shown as thick black lines. The body 45 is shown realistically.

It has been established that best results, so far as forming of the rounded ends of the product are concerned are produced when during forming the forming head 3 is moved downwardly at a speed similar to that of the body 45, i.e. the speed of extrusion determined by the feed pumps for the core material and the outer layer material. However, slight adjustments of the extrusion speed for a given speed of movement of head 3 allow the form of the product to be varied between the spherical as illustrated and the elongate with rounded ends which may for some purposes be desirable.

As has already been stated ball and groove configuration of the oscillator is so chosen that one rotation of the shaft 10 causes one complete oscillatory i.e. vertically reciprocating cycle of the shaft from and back to a top dead centre TDC position. At TDC the blades are open to define the full aperture 38. This cycle will now be described with reference here to FIG. 3 and to FIGS. 6, 6A to 11, 11A of the drawings. FIG. 3 shows one cam track to operate one opposed pair of blades whilst the other cam track as shown in the other Figures operates the other opposed pair of blades and is similar though disposed at right angles to the first track. The movement of one cam peg of the pair will be described in detail, the other cam peg moving similarly in the other 180° of the track.

It should first be noted that the reduction gearing to the head means that each blade 32 performs a complete cutting cycle during a 180° revolution this corresponding to a 360° revolution of the shaft 10 and a complete up and down oscillatory cycle of the forming head 3.

Figure 8:
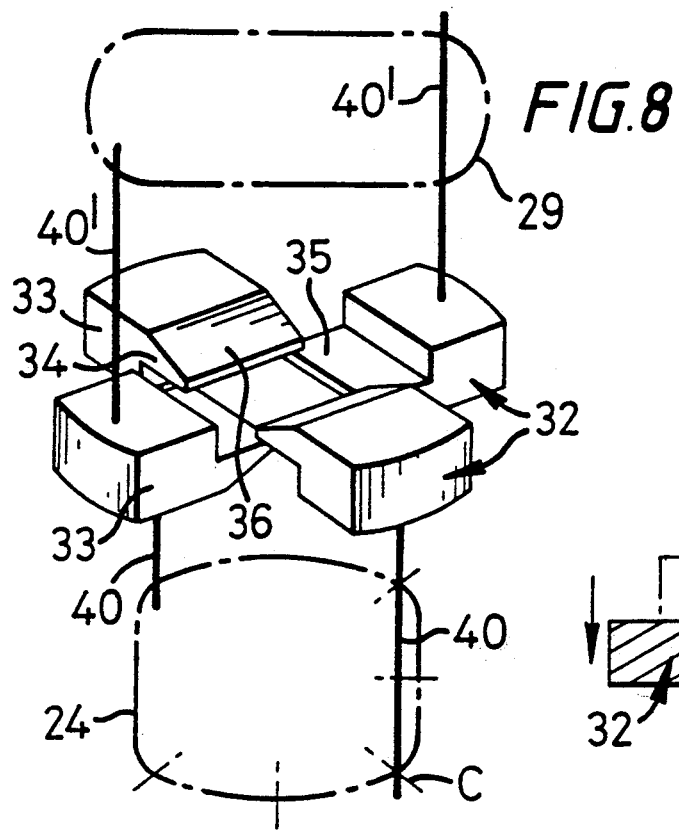
Figure 8A:
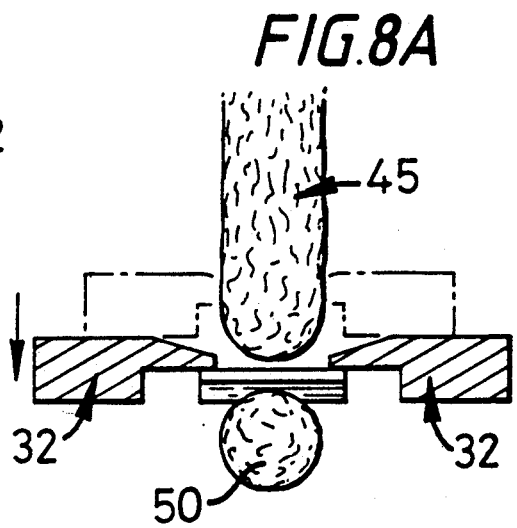
Figure 9:
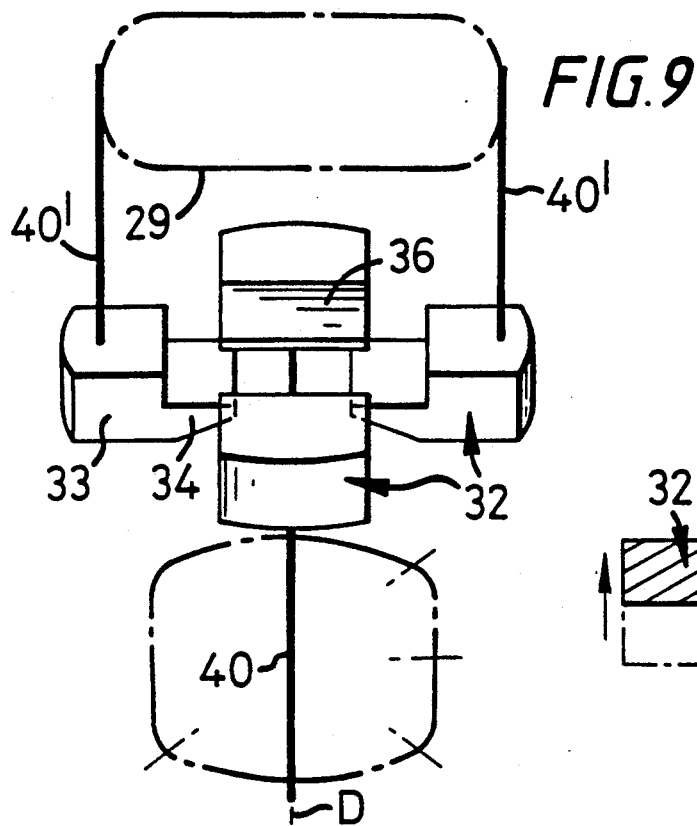
Figure 9A:
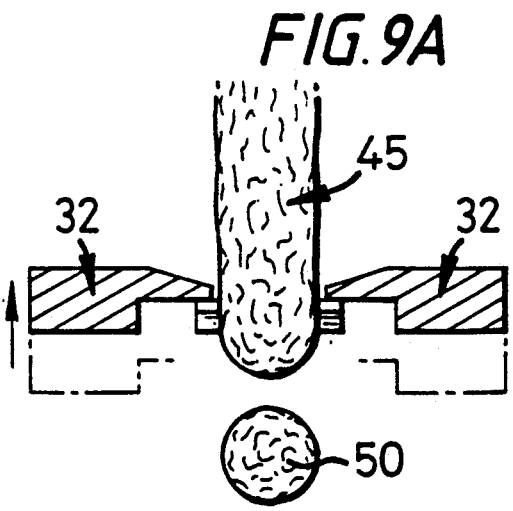

Thus considering the top dead centre position shown in FIGS. 6 and 6A the cam position of the blade is at position A in FIG. 3. The blade is in the outer position and the aperture 38 is open. After 45° of movement with the head 3 moving downwardly with the advancing body 45 the blades have closed completely after 45° as shown in FIGS. 7 and 7A and indicated at position B in FIG. 3. As has already been described when a cam peg 40 enters the straight side 25 of the track the blade 40 is moved radially inwardly. The abutment 61 imparts a closing nip in the region B. During this closure the inclined surfaces 36 of the blades approaching one another serve to draw the outer layer 48 into a spherical termination. There is an inclined pair of meeting surfaces 36 facing both upwardly and downwardly so a spherical termination is produced both above and below the blades after forming and cutting. Thus in FIG. 7A one can see a spherical product 50 formed and severed from the body 45 and a spherical front termination of the body. The head 3 continues to move downwardly to the position shown at FIG. 8 and 8A corresponding to position C on the cam track, the blades then having reopened. This is the Bottom Dead Centre position arrived at after 90° of rotation. The cutting head then starts to rise so that at position D FIGS. 9 and 9A (135° of rotation) halfway along the upstroke the blades remain fully open to return to TDC at E FIGS. 10 and 10A (180° of rotation ) to close and repeat the sequence A,B,C etc. through the other 180° of the track 24 to arrive again at A FIGS. 11 and 11A another product 50 having been formed. One of the products 50 is shown cut in half to show the filling 47, corresponding to the core of body 45 and the closed outer shell 48 corresponding to the outer layer of the body 45.

After cutting and forming the round ended product 50 falls on to the conveyor 64. In this product the casing 48 is drawn round the core 47 so that the product has a substantially unbroken and complete casing.

The products of the present invention, spherical or elongate with rounded ends, will typically be formed with a meat or meat-based outer layer (usually comminuted) whilst the core or filling will usually be a relatively fluid substance in the nature of a sauce.

In an alternative embodiment shaft 10 drives gears to rotate the cam plate 28 and 29. In this embodiment the plate 30 does not rotate. This may be an advantage in some circumstances where it is not desired to impart rotating movement to the cutter blades. In A further embodiment shaft 10' is driven to rotate by a gear similar to 20 at the upper end part such gear meshing with the main gear 21 which drives the cutters.

The reduction in gearing between the shaft and the rotating cam connection in head 3 reduces the speed of movement of the cam parts and hence wear.

We claim:

1. Apparatus for manufacturing a food product comprising:
   (a) a support structure;
   (b) a coextrusion head mounted on said structure connected to means for supplying under pressure core-forming material and casing-forming material and discharging the coextruded body;
   (c) a forming head mounted to reciprocate in the direction of extrusion with an aperture adjacent the coextrusion head, said aperture being defined by blades movable between an open position which allows passage of the body and a closed position which forms a rounded termination of the body and severs the latter into products;
   (d) a rotatable drive shaft in the support structure mounted to reciprocate in the direction of extrusion and connected to the forming head such that reciprocating motion of the shaft produces a corresponding reciprocating motion of the forming head;
   (e) a connection between the shaft and the support structure such that rotation of the shaft causes the reciprocating motion; and
   (f) a connection between the shaft and the blades of the forming head whereby rotation of the shaft drives the blades to open and close.

2. The apparatus according to claim 1 wherein the connection between the shaft and the support structure comprises a ball on the one end and inclined annular groove on the other.

3. The apparatus according to claim 1 wherein the forming head aperture is defined between a plurality of blades each of which is driven to perform a linear motion between an open and a closed position.

4. The apparatus according to claim 3, wherein two pairs of cooperating, reciprocatable blades are provided, each pair being movable generally perpendicularly with respect to the other pair.

5. The apparatus as claimed in claim 3 wherein each blade has a cam connection to a cam track, relative rotation of the cam relative to the track causing the linear motion.

6. The apparatus according to claim 5 wherein the said rotation is caused by a rotating member in the forming head connected by a gear or equivalent to the shaft.

7. The apparatus according to claim 6 wherein there is a reduction in gearing between the shaft and the rotating member whereby one up and down cycle of the shaft caused by one revolution thereof causes a partial revolution of the rotating member.

8. Apparatus for manufacturing a food product comprising:
   (a) a support structure;
   (b) a coextrusion head mounted on said structure connected to means for supplying under pressure core-forming material and casing-forming material and discharging the coextruded body;
   (c) a forming head with an aperture adjacent the coextrusion head, said aperture being defined by blades movable between an open position which allows passage of the body and a closed position which forms a rounded termination of the body and severs the latter into products;
   (d) a rotatable drive shaft reciprocably mounted in the support structure and connected to the forming head so that reciprocating motion of the shaft produces a similar motion of the forming head;
   (e) a connection between the shaft and the support structure comprising a ball on one of the shaft and the support structure and an inclined annular groove on the other of the shaft and the support structure, rotation of the shaft causing the reciprocating motion; and
   (f) a connection between the shaft and the blades of the forming head whereby rotation of the shaft drives the blades to open and close.

* * * * *